United States Patent
Kandukuri et al.

(10) Patent No.: US 11,959,803 B2
(45) Date of Patent: Apr. 16, 2024

(54) UNDERWATER APPARATUS FOR IMAGE-CAPTURING OF THE FLOOR OF A BODY OF WATER

(71) Applicant: PLANBLUE GMBH, Bremen (DE)

(72) Inventors: Raja Kandukuri, Bremen (DE); Guy Rigot, Bremen (DE); Alvaro Bueno, Bremen (DE)

(73) Assignee: PlanBlue GmbH, Bremen (DE)

( * ) Notice: Subject to any disclaimer, the term of this patent is extended or adjusted under 35 U.S.C. 154(b) by 213 days.

(21) Appl. No.: 17/614,011

(22) PCT Filed: May 12, 2020

(86) PCT No.: PCT/EP2020/063175
§ 371 (c)(1),
(2) Date: Nov. 24, 2021

(87) PCT Pub. No.: WO2020/239432
PCT Pub. Date: Dec. 3, 2020

(65) Prior Publication Data
US 2022/0221343 A1 Jul. 14, 2022

(30) Foreign Application Priority Data
May 28, 2019 (DE) ............ 10 2019 114 269.5

(51) Int. Cl.
*G01J 3/28* (2006.01)
*G03B 17/08* (2021.01)
*G03B 17/56* (2021.01)

(52) U.S. Cl.
CPC ............ *G01J 3/2823* (2013.01); *G03B 17/08* (2013.01); *G03B 17/563* (2013.01)

(58) Field of Classification Search
None
See application file for complete search history.

(56) References Cited

U.S. PATENT DOCUMENTS

D332,459 S  *  1/1993  Morimiya ................ D16/208
6,262,761 B1   7/2001  Zernov et al.
(Continued)

FOREIGN PATENT DOCUMENTS

CN    206038539 U   *   3/2017
CN    110217364 A   *   9/2019   ............ B63G 8/001
(Continued)

OTHER PUBLICATIONS

Hyperspectral Camera, thesextonco.com/project/hyperspectral-camera-2016/ (Year: 2016).*
(Continued)

*Primary Examiner* — Rodney E Fuller
(74) *Attorney, Agent, or Firm* — Hodgson Russ LLP (57) ABSTRACT

An underwater device has a hyperspectral camera for capturing images of a seabed, a first housing part, a second housing part releasably connected to the first housing part in a watertight manner and enclosing with the first housing part a cavity in which the hyperspectral camera is arranged, and an electrical energy storage device for supplying electrical energy to the hyperspectral camera arranged in another cavity, wherein the other cavity is separated from the cavity by a wall section of the first and/or second housing part.

17 Claims, 5 Drawing Sheets

(56) References Cited

U.S. PATENT DOCUMENTS

| | | | |
|---|---|---|---|
| 2007/0203623 A1* | 8/2007 | Saunders | B63B 3/04 701/23 |
| 2007/0242134 A1* | 10/2007 | Zernov | B63G 8/001 348/81 |
| 2013/0229515 A1 | 9/2013 | Barley et al. | |
| 2016/0178993 A1 | 6/2016 | Bianciardi | |
| 2018/0095344 A1 | 4/2018 | Riddiford et al. | |
| 2018/0109739 A1* | 4/2018 | Foley | G03B 17/02 |
| 2019/0100294 A1* | 4/2019 | Xiong | B63C 11/52 |

FOREIGN PATENT DOCUMENTS

| | | |
|---|---|---|
| DE | 9111982 U1 | 1/1992 |
| EP | 1394822 A2 | 3/2004 |
| EP | 2902756 A1 | 8/2015 |

OTHER PUBLICATIONS

Arjun Chennu et al., "A diver-operated hyperspectral imaging and topographic surveying system for automated mapping of benthic habitats", Scientific Reports, vol. 7, No. 1, Aug. 2, 2017.

* cited by examiner

UNDERWATER APPARATUS FOR IMAGE-CAPTURING OF THE FLOOR OF A BODY OF WATER

The invention relates to an underwater device with a hyperspectral camera for capturing images of a seabed. Furthermore, the invention relates to an autonomous underwater vehicle and a cable-guided underwater vehicle each having such an underwater device.

There exists a need to monitor marine and freshwater ecosystems from both an economic and ecological perspective. One challenge in monitoring ecosystems is that, on the one hand, a fine spatial resolution of the seabed is needed to capture the high diversity of organisms with sufficient accuracy and, on the other hand, a large area must be examined.

Underwater devices are known from the prior art which have a camera and by means of which images of the seabed are captured. The known underwater devices are very large and cumbersome. This means that adapting the underwater device to different areas of application requires a great deal of time. In particular, the installation and removal of electrical consumers in the underwater device requires a great deal of time.

The object of the invention is to provide an underwater device that can be quickly adapted to the desired field of application and/or purpose.

The object is achieved by an underwater device having a hyperspectral camera for capturing images of a seabed, a first housing part, a second housing part releasably connected to the first housing part in a watertight manner and enclosing with the first housing part a cavity in which the hyperspectral camera is arranged, and an electrical energy storage device for supplying electrical energy to the hyperspectral camera arranged in another cavity, wherein the other cavity is separated from the cavity by a wall section of the first and/or second housing part.

The underwater device according to the invention has the advantage that it is compactly designed and consists of few components. In addition, the electrical energy storage device is easily accessible so that it can be replaced in a simple and quick manner. Since the other cavity is separated from the cavity in a watertight manner, water can easily be prevented from accidentally entering the cavity when changing the electrical energy storage device.

It can also be quickly assembled and disassembled. After the connection between the first housing part and the second housing part has been released, the hyperspectral camera arranged in the cavity can be easily accessed. Furthermore, once the connection has been released, other mechanical components and/or electrical consumers located in the cavity can be easily accessed. As a result, the underwater device can be quickly converted to suit its intended use and/or location.

In operation, the underwater device can be arranged partially or completely in the water. For the examination of a seabed, the underwater device can be completely immersed in the water. The underwater device can be used to study marine and freshwater ecosystems.

The releasable connection between the first housing part and the second housing part is designed in a watertight manner. This prevents water from entering the cavity and damaging electrical consumers. The watertight connection ensures that there are no passages in a connecting area between the first housing part and the second housing part through which water can flow into the cavity. The releasable connection can have a screw connection.

Electrical consumers are components of the underwater device that have electronic components and can therefore be damaged if they come into contact with water, in particular condensation water, and/or the humidity of the air surrounding them is too high.

A hyperspectral camera is a camera that captures multispectral data in very narrow spectral bands of visible light, near infrared and mid infrared. Hyperspectral cameras thus allow high spectral resolution of object-specific signatures in more than 15, but generally in 30-200 contiguous channels, enabling documentation of a nearly continuous spectrum for each image element.

In a particular embodiment, the underwater device can have a colour camera for capturing images of the seabed. The colour camera can be arranged in the cavity and/or be an RGB camera.

The colour camera, especially RGB camera, is not a hyperspectral camera. The colour camera differs from the hyperspectral camera in that it has fewer channels than the hyperspectral camera, in particular exactly three channels. Accordingly, with a colour camera, the viewed object cannot be spectrally resolved as high as with a hyperspectral camera. The use of a colour camera and a hyperspectral camera offers the advantage that several images are captured of the same object, which is beneficial for image evaluation.

The colour camera and the hyperspectral camera can be arranged in a cavity section partially enclosed by the first housing part or the second housing part. Thus, tolerances of only one housing part have to be considered when arranging and mounting the hyperspectral camera and/or the colour camera.

The first housing part can have an opening in which a transparent plate, in particular a glass pane, is arranged in a watertight manner. The hyperspectral camera can be arranged in such a way that the image can be captured through the transparent plate. The colour camera can be arranged inside the cavity in the same way that images can be captured through the transparent plate. The hyperspectral camera and the RGB camera can be arranged entirely within the cavity. As a result, it is easy to ensure that the colour camera and/or hyperspectral camera are protected from coming into contact with water and that images of the seabed can be captured.

In a particular embodiment, a connecting direction for connecting the first housing part to the second housing part can be directed along a centre axis of the first housing part and/or the second housing part. Furthermore, the connecting direction can be perpendicular to an end face plane of the first housing part and/or the second housing part. The connection of the first housing part and the second housing part along the connecting direction offers the advantage that the connecting area to be sealed is small. Thus, sealing is merely required along an end face circumference of the first housing part and/or the second housing part. The end face plane can be an axial normal plane to the centre axis and/or parallel to a vertical plane. The vertical plane is perpendicular to a horizontal seabed.

For sealing, at least one seal can be arranged between the first housing part and the second housing part. The seal can be arranged on an end face area of the first and/or second housing part. As a result, the watertight connection between the first housing part and the second housing part can be realised in a simple manner.

After joining the two housing parts, the end face of the first housing part can be in contact with the second housing part and/or the end face of the second housing part can be in contact with the first housing part.

In a particular embodiment, the two housing parts can be connectable to one another by hand and/or releasable from one another by hand. The connection of the two housing parts to one another or the disconnection from one another is performed in a non-destructive manner. Thus, the underwater device can be easily assembled or disassembled.

Assembly or disassembly of the underwater device is particularly easy if the first housing part forms one half of the housing and the second housing part forms a second half of the housing of the underwater device. In this design, the underwater device has exactly two housing components, namely the two housing halves. The effort required to assemble or disassemble the underwater device is minimised with this design.

In a particular embodiment, the wall section of the first housing part and/or the second housing part can completely separate the cavity from the other cavity. This is advantageous because it cannot be ruled out that water can flow into the other cavity when the electrical energy storage device is replaced. A replacement of the electrical energy storage device will usually be performed on board of a ship. Depending on the sea state, it cannot be ruled out that the underwater device may come into contact with water.

However, with the underwater device according to the invention, the wall section prevents water from entering the cavity from the other cavity. As a result, the wall section prevents the electrical consumers located in the cavity, such as the cameras, control devices, etc., from coming into contact with water. Due to the watertight separation of the cavity from the other cavity, the electrical energy storage device can also be replaced on board of a ship with the underwater device according to the invention.

The underwater device can be designed in such a way that the wall section of the first housing part and/or the second housing part delimits both the cavity and the other cavity. This makes it possible to realise a particularly compact underwater device. One advantage of a compact underwater device is that it is easier to manoeuvre under water than large underwater devices.

In a particular embodiment, the electrical energy storage device can be designed in such a way that it can be inserted into the other cavity. This allows the electrical energy storage device to be easily inserted into the other cavity. In the same way, the electrical energy storage device can be pushed out of the other cavity. Therefore, in the underwater device, insertion of the electrical energy storage device into the other cavity or removal of the electrical energy storage device from the other cavity can be handled in a simple manner.

The electrical energy storage device can be designed to be modular, which further simplifies insertion and removal. The electrical energy storage device can have at least one battery.

When the electrical energy storage device is inserted into the other cavity, an electrical connection can be automatically established between the electrical energy storage device and the hyperspectral camera and/or another electrical consumer of the underwater device. The electrical energy storage device can have an electrical interface, such as a connector, which is coupled to another electrical interface of the first or second housing part to implement the electrical connection. This makes the installation of the electrical energy storage device particularly easy because the steps to be taken by the user are minimised. There can be an opening in the wall section through which electrical lines are routed. Electrical consumers of the underwater device can be electrically connected to the electrical energy storage device by means of the electrical lines.

The underwater device can be designed in such a way that an electrical line between the electrical energy storage device and the hyperspectral camera and/or between the electrical energy storage device and another electrical consumer runs exclusively within the first housing part and/or the second housing part. In doing so, the electrical line can run in such a way that it does not come into contact with water. This offers the advantage that, during the diving process, the danger is eliminated that, for example, the user unintentionally disconnects the electrical connection between the electrical energy storage device and the electrical consumer.

The other cavity can have a cavity cover by means of which the other cavity can be closed. The cavity cover can be attached to the first or second housing part. Furthermore, the cavity cover can be movable relative to the first or second housing part.

In a particular embodiment, there can be at least one rail-shaped touchdown device for placing on the seabed. At least one weight can be attached to the touchdown device. One part of the touchdown device can be fixed to the first housing part and another part of the rail can be fixed to the second housing part. The touchdown device can be designed in such a way that the weight can be positioned at different points on the rail. This makes it easy to adjust the centre of mass of the underwater device. Thus, the weight can be positioned on the rail in such a way that a centre of buoyancy of the underwater device and a centre of mass of the underwater device lie in an axial normal plane to the centre axis of the underwater device. This is a simple way to prevent the underwater device from rotating and the user from having to apply a force to prevent it from rotating.

The underwater device can have several touchdown devices, in particular exactly two touchdown devices. The touchdown devices can be arranged in parallel or at an angle to one another. Furthermore, the touchdown devices can protrude from the first and/or second housing part in such a way that the underwater device can be placed on the seabed by means of the touchdown devices. Thus, the underwater device does not need to have separate feet by means of which the underwater device can be placed on the seabed.

The underwater device can map the seabed based on the images captured. Compared to previous underwater devices, the use of the underwater device according to the invention enables a very precise examination of the seabed.

In a particular embodiment, the underwater device can be designed in such a way that it is manually controllable and/or operable and/or portable. This means that the underwater device is not controlled remotely by a ship, but solely by the diver. The underwater device can be designed without a propeller. This means that the underwater device is propelled solely by the diver. The underwater device thus does not have a drive motor to drive the underwater device.

In a particular embodiment, the first housing part and/or the second housing part can have another opening and a cover for closing the other opening in a watertight manner. One sensor of the underwater device and the other opening can be arranged in one plane. The plane can be an axial normal plane to the centre axis of the underwater device.

The cover can be made of a different material than the first housing part and/or the second housing part. The first housing part and/or the second housing part can be made of metal. However, metal prevents some measurement signals and/or data signals from reaching the sensor, such as a Global Navigation Satellite System (GNSS) sensor. Therefore, the cover has the advantage that such measurement signals and/or data signals can be received. Indeed, the other material of the cover can be designed to allow wireless communication between the sensor and a different communication means. In particular, the other material can be selected in such a way that it does not reflect radio data and thus enables the sensor to receive data.

The underwater device can have at least one handle for steering the underwater device. The handle can be attached to the first housing part and/or the second housing part. The handle allows the underwater device to be maneuvered easily.

The first housing part and/or the second housing part can have an indentation facing away from the handle. The indentation and the handle are arranged in such a way that they are located in an axial normal plane to the centre axis of the underwater device. Since gloves are often worn under water, the indentation allows the handle to be placed close to the first housing part and/or the second housing part. The handle can be easily grasped by the user because there is sufficient space due to the indentation.

In a particular embodiment, the underwater device can have a valve that opens when a pressure in the cavity is too high. Alternatively, the valve can be opened by a user. In addition, there can be another valve that opens when the pressure in the other cavity is too high. Alternatively, the other valve can be opened by a user. As a result, excess pressure in the cavity and/or the other cavity can be easily relieved or prevented.

It is of particular advantage if the underwater device is a diver-operated underwater device. Diver-operated underwater device means a device that can be operated by a diver in or under water. This means that the diver can move the underwater device in or under the water and thus move it to the desired position to capture images of the desired area of the seabed. In addition, the diver can operate the underwater device in or under water, in particular enter corresponding commands to capture images of the seabed.

Alternatively, the underwater device can be an autonomous underwater vehicle. With this design, the underwater device does not need to be moved by the diver to capture images of the seabed. The underwater vehicle can be controlled autonomously.

Alternatively, the underwater device can be a cable-guided underwater vehicle (remotely operated vehicle). With this design, the underwater device does not need to be moved by the diver to capture images of the seabed. The underwater vehicle can be controlled by a person on the ship.

The subject matter of the invention is shown schematically in the figures, wherein elements that are the same or have the same effect are mostly provided with the same reference symbols. In the figures.

Figure 1:
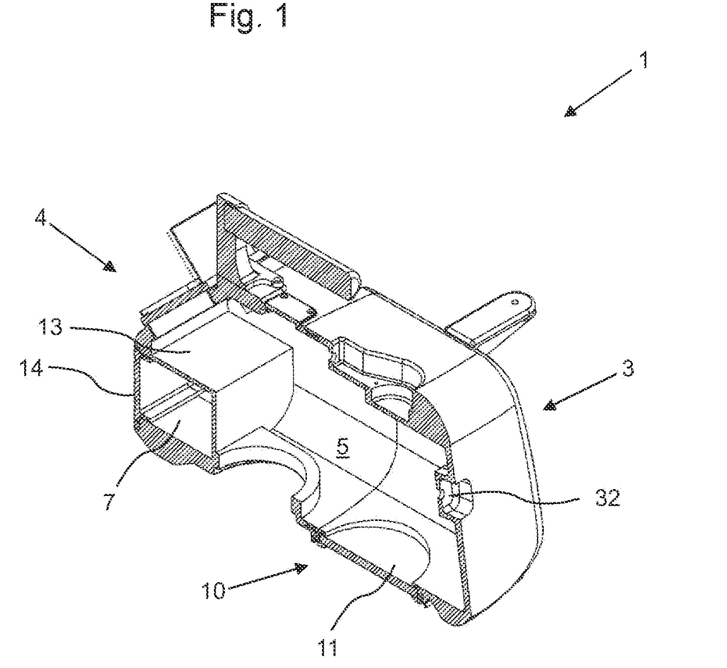
FIG. 1 shows a side section view of an underwater device according to the invention without electrical consumers.

The underwater device 1 shown in FIG. 1 is a diver-operated underwater device. The underwater device 1 can alternatively be an autonomous underwater vehicle or a cable-guided underwater vehicle.

The underwater device 1 has a first housing part 3 and a second housing part 4, which is releasably connected to the first housing part 3 in a watertight manner. The first and second housing parts 3, 4 enclose a cavity 5. In addition, the second housing part 4 has another cavity 7 which is completely separated from the cavity 5 in a watertight manner by a wall section 13 of the second housing part 4. The other cavity 7 is closed by a cavity cover 14. The cavity cover 14 is again releasably connected to the second housing part 4. In the embodiment shown in FIG. 1, there are no electrical consumers either in the cavity 5 or in the other cavity 7.

The first housing part 3 has an opening 10. A transparent plate 11 in the form of a glass pane is arranged in the opening 10. The transparent plate 11 is designed in such a way and connected to the first housing part 3 in such a way that water is prevented from entering the cavity 5 through the opening 10.

The first housing part 3 has a recess 32 at its end facing away from the second housing part 4. The recess 32 is used to accommodate sensors not shown in the figures. Alternatively or in addition, a communication means for sending and/or receiving data can be arranged in the recess 32. Using the communication means, a data-transmitting connection can be established with, for example, another communication means located on a ship.

Figure 2:
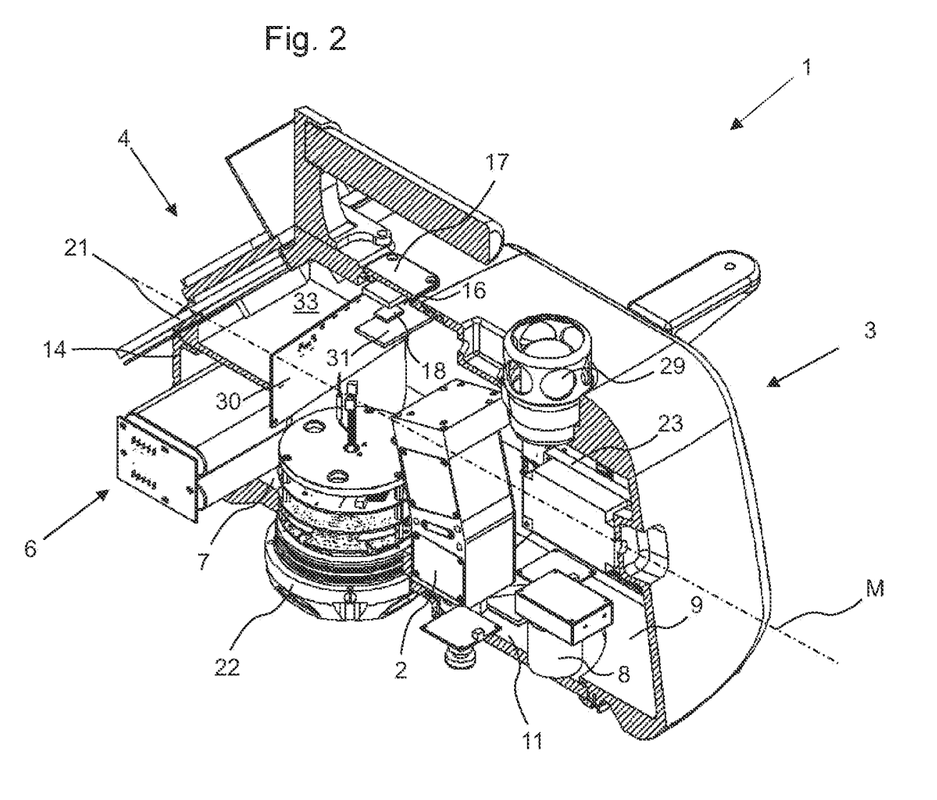
FIG. 2 shows a side section view of the underwater device according to the invention with electrical consumers.

FIG. 2 shows a side section view of the underwater device 1 according to the invention with electrical consumers. The underwater device 1 has a hyperspectral camera 2 and a colour camera 8 arranged in the cavity 5. Furthermore, the underwater device 1 has an electrical energy storage device 6 for supplying electrical energy to the hyperspectral camera 2 and the colour camera 8. In addition, the electrical energy storage device 6 supplies further electrical consumers of the underwater device 1. The electrical energy storage device 6 is arranged in the other cavity 7 and can have several batteries.

In the figures, the electrical lines between the electrical energy storage device 6 and the colour camera 8 and the hyperspectral camera 2 and the other electrical consumers (not shown) are not shown. However, they run inside the first housing part 3 and/or the second housing part 4. In particular, the electrical lines are arranged in such a way that they do not come into contact with water and thus do not run outside the first housing part 3 and the second housing part 4.

The colour camera 8 and the hyperspectral camera 2 are arranged in the cavity 5 in such a way that they can each capture images through the transparent plate 11. In addition, the colour camera 8 and the hyperspectral camera 2 are arranged in a cavity section 9 defined by the first housing part 3. The cavity 5 is composed of the cavity section 9 defined by the first housing part 3 and another cavity section 33 defined by the second housing part 4.

The underwater device 1 has another opening 16 in the second housing part 4. The other opening 16 is closed by a cover 17. The cover 17 is made of a different material than the first housing part 3 and the second housing part 4. A sensor 18, in particular a GNSS sensor, is arranged below the cover 17. In this case, the sensor 18 is arranged in such a way that it and the other opening 16 are arranged in one plane, in particular an axial normal plane to a centre axis M of the underwater device 1.

Furthermore, the underwater device 1 has a display device 21 by means of which, for example, images captured by the cameras are displayed to a user. Furthermore, operating states of the underwater device 1 can be displayed to the user via the display device 21. The data obtained from the cameras 2, 8 and/or other electrical consumers can be processed by a control device 23 arranged in the cavity 5.

The display device 21 and/or the electrical consumers and/or the control device 23 are arranged in the cavity 5.

The underwater device 1 also has a measuring device 22, such as a Doppler Velocity Log, by means of which the direction of the underwater device 1 and speed over ground can be measured. The measuring device 22 protrudes from an opening of the first housing part 3 and the second housing part 4. In this case, the measuring device 22 is designed in such a way and/or connected to the first housing part 3 and the second housing part 4 in such a way that no water can flow into the cavity 5 of the underwater device 1.

The underwater device 1 further has a position determination element 29 for determining the position of the underwater device 1 under water. The position determining element 29 can be an ultra short baseline (USBL) device and can be arranged in a recess of an outer side of the first housing part 3.

Furthermore, the underwater device 1 has an energy distribution unit 30 arranged inside the cavity 5. The energy distribution unit 30 is used to distribute the electrical energy from the electrical energy storage device to the electrical consumers of the underwater device 1. In this regard, the energy distribution unit 30 can disconnect the electrical connection between the electrical energy storage device and the electrical consumer if, for example, a hazardous condition, such as water entering the cavity 5, is detected.

Furthermore, the underwater device 1 has a detection means 31, such as an IMU sensor (inertial measurement unit) for detecting a movement of the underwater device 1. The detection means 31 is used for navigation of the underwater device 1 and is arranged in the cavity 5.

Figure 3:
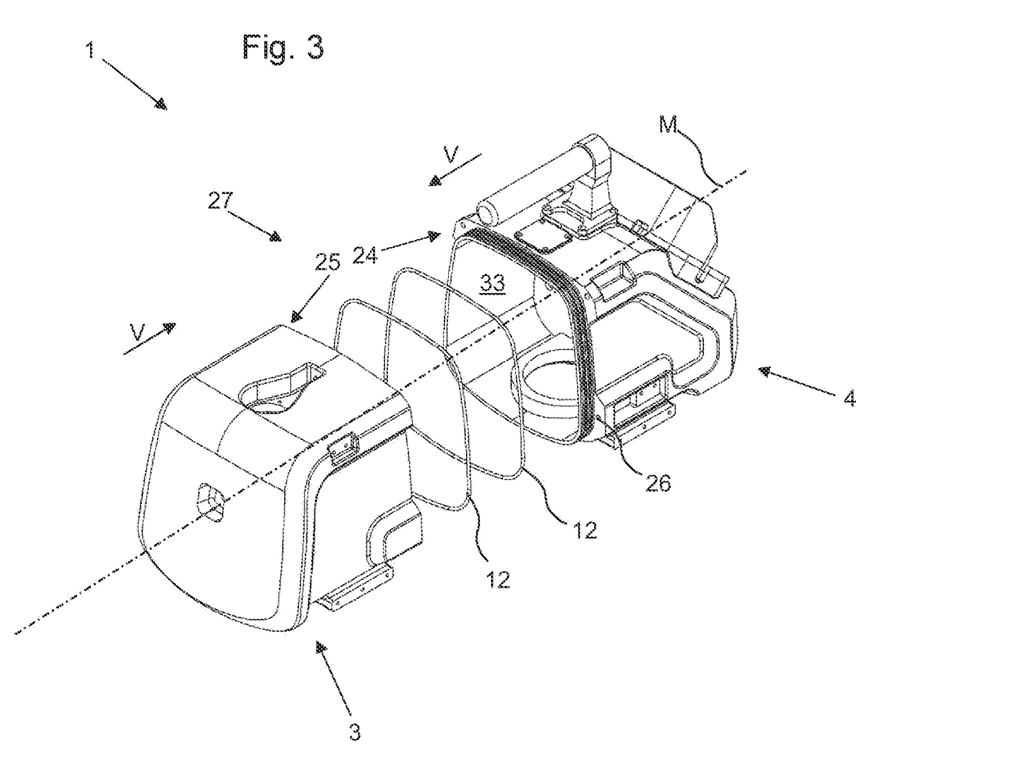
FIG. 3 shows an exploded view of the underwater device according to the invention.

FIG. 3 shows an exploded view of the underwater device 1 according to the invention. In order to connect the two housing parts 3, 4, the first housing part 3 and/or the second housing part 4 are moved towards one another in the connecting direction V along the centre axis M of the underwater device 1. The connecting direction V of the first housing part 3 is opposite to the connecting direction V of the second housing part 4. Both connecting directions V run perpendicular to an end face plane of the first housing part 3 and/or the second housing part 4.

The first housing part 3 and the second housing part 4 are connected to one another in a connecting area 27. The connecting area 27 runs in the circumferential direction of an end face 24 of the first housing part and/or an end face 25 of the second housing part 4. In particular, after connecting the first housing part 3 to the second housing part 4, the end face 24 of the first housing part 3 is in contact with the second housing part 4 and the end face 25 of the second housing part 4 is in contact with the first housing part 3. Seals 12 are arranged between the first housing part 3 and the second housing part 4 for the watertight connection of the first housing part 3 with the second housing part 4.

The first housing part 3 and the second housing part 4 can again be releasably connected to one another. The releasable connection can, for example, be realised by screws. FIG. 3 shows a hole 26 for receiving a screw.

Figure 4:
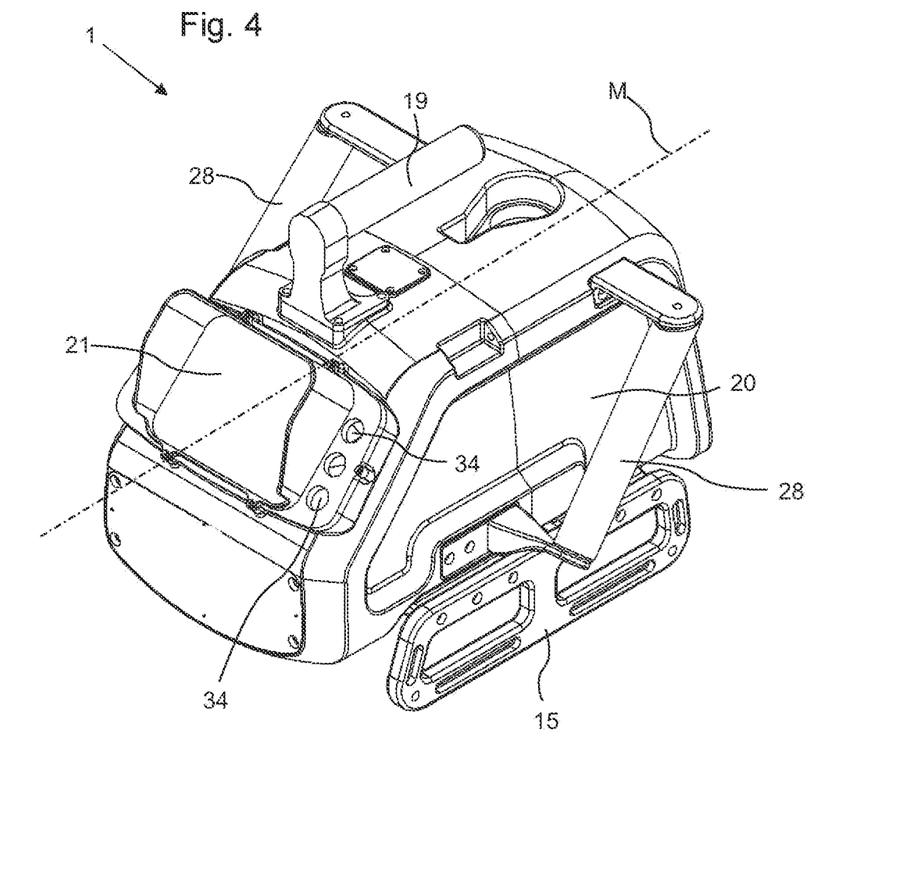
FIG. 4 shows a perspective view of the underwater device according to the invention.
Figure 5:
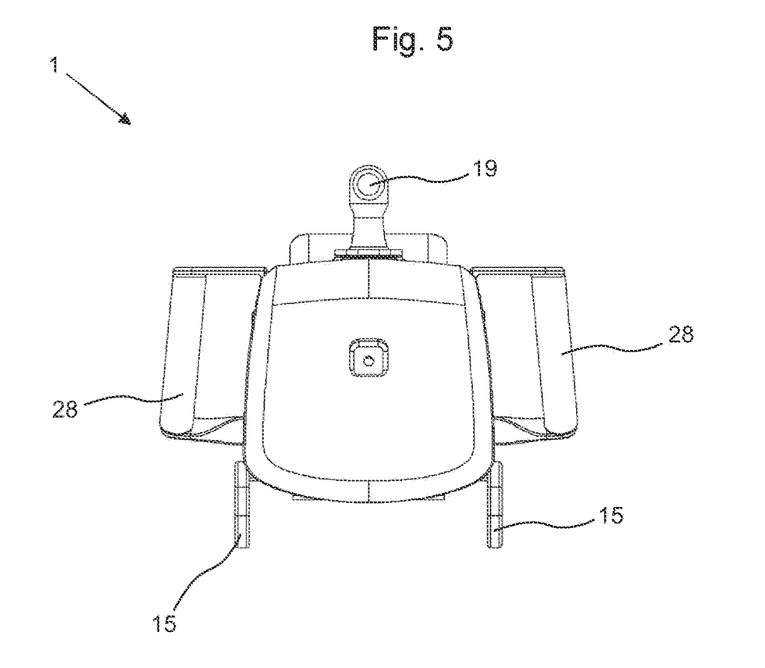
FIG. 5 shows a front view of the underwater device according to the invention.

FIG. 4 shows a perspective view of the underwater device 1 according to the invention and FIG. 5 shows a front view of the underwater device 1 according to the invention. The underwater device 1 has two rail-shaped touchdown devices 15 which are arranged opposite one another with respect to the first housing part 3 and the second housing part 4 and are used to place the underwater device 1 on a seabed. One part of the touchdown device 15 is firmly connected to the first housing part 3 and another part of the touchdown device 15 is firmly connected to the second housing part 4.

The touchdown devices 15 are designed in such a way that at least one weight can be positioned at different points on them. By positioning the weight, the centre of mass of the underwater device 1 can be adjusted. In particular, the weight can be arranged in such a way that the centre of mass and the centre of buoyancy of the underwater device 1 are arranged in an axial normal plane to the centre axis M.

The touchdown devices 15 protrude from the first housing part 3 and the second housing part 4. They protrude further than the measuring device 22, which is not shown in FIGS. 4 and 5. This prevents the measuring device 22 from coming into contact with the seabed when the underwater device 1 is placed on the seabed.

The underwater device 1 also has three handles. A handle 28 is arranged on each side of the underwater device 1. In addition, another handle 19 is arranged on an upper side of the underwater device 1. On each of the two sides of the underwater device 1, there is an indentation 20 in the first housing part 3 and the second housing part 4.

The indentations 20 allow the user to grip around the handles 28 without being obstructed by the first housing part 3 and/or the second housing part 4. The indentations 20 and the laterally positioned handles 28 are arranged in such a way that an axis normal plane to the centre axis M has at least one handle and the indentation 20. Each of the two indentations 20 extends almost over the entire length of the underwater device 1. In this regard, the indentations 20 can extend and be designed in such a way as to facilitate the operation of buttons 34.

Commands for the underwater device 1 can be entered by means of the buttons 34.

LIST OF REFERENCE SIGNS

1 Underwater device
2 Hyperspectral camera
3 First housing part
4 Second housing part
5 Cavity
6 Electrical energy storage device
7 Other cavity
8 Colour camera
9 Cavity section
10 Opening
11 Transparent plate
12 Seal
13 Wall section
14 Cavity cover
15 Rail-shaped touchdown device
16 Other opening
17 Cover
18 Sensor
19 Other handle
20 Indentation
21 Display device
22 Measuring device
23 Control device
24 End face of the first housing part
25 End face of the second housing part
26 Hole
27 Connecting area
28 Handle
29 Position determination element
30 Energy distribution unit
31 Detection means
32 Recess
33 Other cavity section 34 Button
V Connecting direction

The invention claimed is:

1. An underwater device (1) having a hyperspectral camera (2) for capturing images of a seabed, a first housing part (3), a second housing part (4) which is releasably connected to the first housing part (3) in a watertight manner and encloses with the first housing part (3) a cavity (5) in which the hyperspectral camera (2) is arranged and an electrical energy storage device (6) for supplying electrical energy to the hyperspectral camera (2), which is arranged in another cavity (7), wherein the other cavity (7) is separated from the cavity (5) by a wall section (13) of the first and/or second housing part (3, 4) wherein the wall section (13) of the first housing part (3) and/or the second housing part (4) delimits both the cavity (5) and the other cavity (7).

2. The underwater device (1) according to claim 1, characterised by a colour camera (8) for capturing images of the seabed, which is arranged in the cavity (5).

3. The underwater device (1) according to claim 2, characterised in that the colour camera (8) and the hyperspectral camera (2) are arranged in a cavity section (9) partially enclosed by the first housing part (3).

4. The underwater device according to claim 1, characterised in that
   a. the first housing part (3) has an opening (10) in which a transparent plate (11) is arranged in a watertight manner and the hyperspectral camera (2) is arranged in such a way that the image can be captured through the transparent plate (11) and/or in that
   b. a connecting direction (V) for connecting the first housing part (3) to the second housing part (4) is directed along a centre axis (M) of the first housing part (3) and/or of the second housing part (4) and/or is perpendicular to an end face plane of the first housing part (3) and/or of the second housing part (4) and/or in that
   c. after the two housing parts (3, 4) have been joined, one end face of the first housing part (3) is in contact with the second housing part (4) and/or one end face of the second housing part (4) is in contact with the first housing part (3).

5. The underwater device (1) according to claim 1, characterised in that
   a. at least one seal (12) is arranged between the first housing part (3) and the second housing part (4) and/or in that
   b. the two housing parts (3, 4) are connectable to one another by hand and/or releasable from one another by hand.

6. The underwater device (1) according to claim 1, characterised in that the wall section (13) of the first housing part (3) and/or of the second housing part (4) completely separates the cavity (5) from the other cavity (7).

7. The underwater device (1) according to claim 1, characterised in that the electrical energy storage device (6) is designed in such a way that it can be inserted into the other cavity (7).

8. The underwater device (1) according to claim 7, characterised in that, when the electrical energy storage device (6) is inserted into the other cavity (7), an electrical connection is automatically established between the electrical energy storage device (6) and the hyperspectral camera (2) and/or another electrical consumer of the underwater device (1).

9. The underwater device (1) according to claim 1, characterised by a cavity cover (14) for closing the other cavity (7).

10. The underwater device (1) according to claim 1, characterised by at least one rail-shaped touchdown device (15) for placing the underwater device (1) on a seabed, and characterised in that a part of the at least one touchdown device (15) is firmly connected to the first housing part (3) and another part of the at least one touchdown device (15) is firmly connected to the second housing part (4).

11. The underwater device (1) according to claim 1, characterised by two touchdown devices (15) for placing the underwater device (1) on a seabed, and which
   a. run parallel to one another and/or
   b. protrude from the first housing part (3) and/or the second housing part (4) in such a way that the underwater device (1) can be placed on the seabed by means of the touchdown device (15).

12. The underwater device (1) according to claim 1, characterised in that
   a. the underwater device (1) maps the seabed based on the images captured and/or in that
   b. the underwater device (1) is designed in such a way that it is manually controllable and/or operable and/or portable and/or in that
   c. the underwater device (1) is designed without a propeller.

13. The underwater device (1) according to claim 1, characterised in that the first housing part (3) and/or the second housing part (4) have another opening (16) and a cover (17) for closing the other opening (16) in a watertight manner, and a sensor (18) of the underwater device (1) and the other opening (16) are arranged in one plane.

14. The underwater device (1) according to claim 13, characterised in that the cover (17) consists of a different material than the first housing part (3) and/or the second housing part (4).

15. The underwater device (1) according to claim 1, characterised by at least one handle (19) for controlling the underwater device (1), which is attached to the first housing part (3) and/or the second housing part (4).

16. The underwater device (1) according to claim 15, characterised in that the first housing part (3) and/or the second housing part (4) has an indentation (20) facing away from the handle (19).

17. The underwater device according to claim 1, characterised in that the underwater device is a diver-operated underwater device or an autonomous underwater vehicle or a cable-guided underwater vehicle.

* * * * *